United States Patent

Stecker, Sr.

[11] Patent Number: 5,144,994
[45] Date of Patent: Sep. 8, 1992

[54] PORTABLE UNIVERSAL SAW TABLE

[76] Inventor: David W. Stecker, Sr., 23W540 Bryn Mawr, Roselle, Ill. 60172

[21] Appl. No.: 723,322

[22] Filed: Jun. 28, 1991

[51] Int. Cl.$^5$ .................... B27B 5/24; B25H 1/00; B27C 9/00
[52] U.S. Cl. .................... 144/286 A; 83/471.2; 83/574; 83/859; 83/467.1; 144/286 R; 269/296; 269/311
[58] Field of Search ............ 269/290, 295, 296, 297, 269/309, 311; 83/471, 471.2, 471.3, 574, 859, 467.1; 144/1 R, 286 R, 286 A, 287

[56] References Cited

U.S. PATENT DOCUMENTS

| | | |
|---|---|---|
| 2,785,708 | 3/1957 | Krogen . |
| 2,973,020 | 2/1961 | Bennett . |
| 3,866,496 | 2/1975 | Payne et al. . |
| 3,933,348 | 1/1976 | Tidwell, Jr. ............... 269/297 |
| 4,133,237 | 1/1979 | Lewin . |
| 4,197,775 | 4/1980 | Handler et al. . |
| 4,327,619 | 5/1982 | McNamee . |
| 4,570,915 | 2/1986 | O'Hern ............... 269/296 |
| 4,694,720 | 9/1987 | Brickner, Jr. et al. ......... 144/286 R |
| 4,884,791 | 12/1989 | Callender ............... 269/296 |
| 4,974,651 | 12/1990 | Carmon et al. . |

Primary Examiner—W. Donald Bray
Attorney, Agent, or Firm—Lee, Mann, Smith McWilliams, Sweeney & Ohlson

[57] ABSTRACT

A portable universal saw table used to rip long narrow pieces such as trim molding, siding and plywood which supports a long piece while sawing without binding the power saw including two parallel rails held by cross braces between which are removable cross pieces for supporting the work piece. The cross pieces are cut during sawing and are replaced when sufficiently chopped up. The table also permits transverse cutting. A back guide is provided. An electric saw platform is also provided.

7 Claims, 2 Drawing Sheets

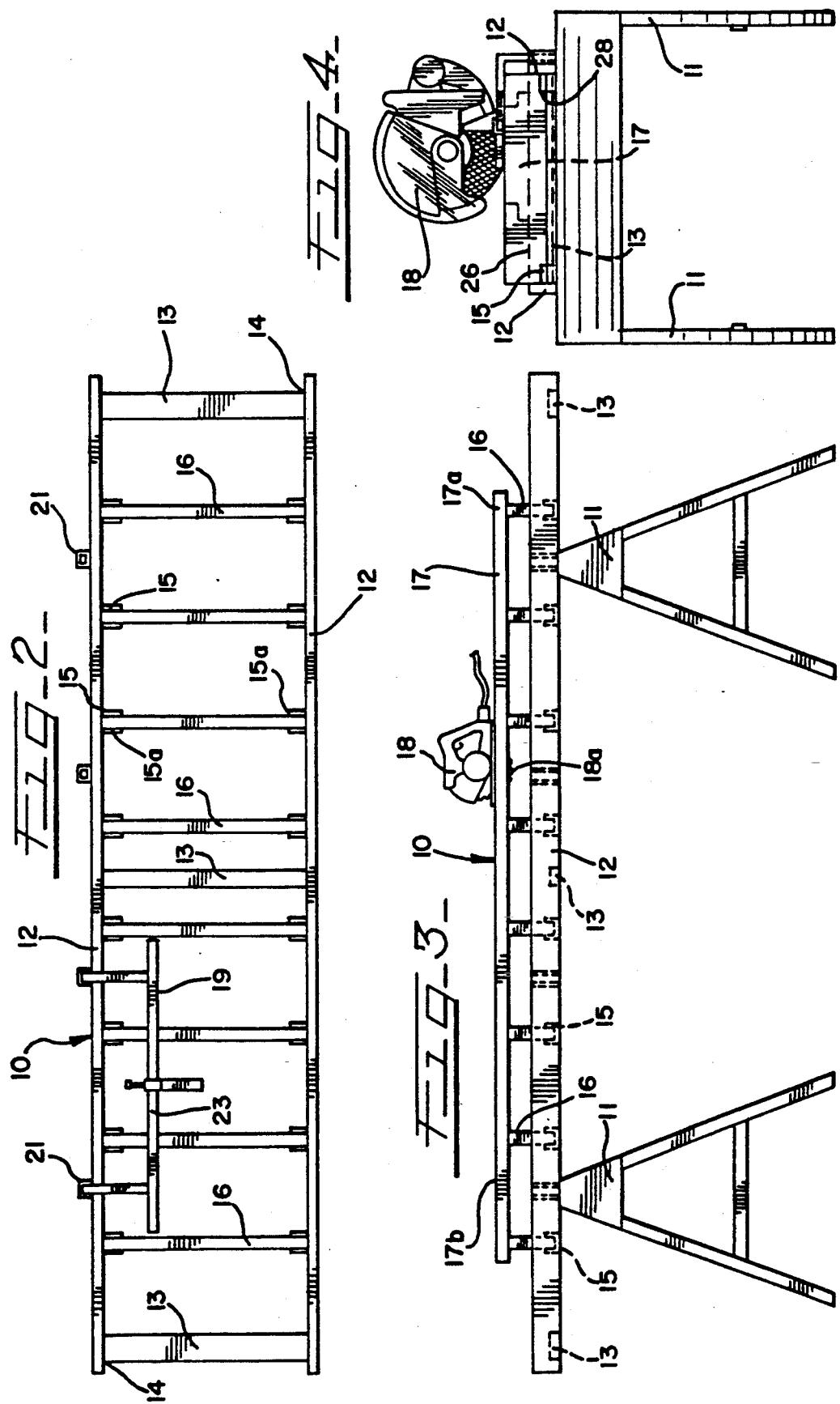

PORTABLE UNIVERSAL SAW TABLE

BACKGROUND OF THE INVENTION

A carpenter cutting or ripping a long work piece such as trim, molding, siding and plywood with a rotary power saw frequently experiences cinching of the saw blade. This happens in lengthwise cutting a long pieces on, for example, two saw horses because of the weight of the piece and lack of support thereof. The same is true of cross cutting. This cinching of the saw blade can cause damage to the saw and to the work piece itself. To overcome this problem a long narrow saw table such as shown in Brickner et al. U.S. Pat. No. 4,694,720 is desirable. However, such a table has a distinct disadvantage because the cross pieces or bars would also be cut during lengthwise cutting and since the bars are permanently attached to the table they cannot readily be repaired or replaced. It is an object of this invention to provide a saw table that overcomes this problem.

SUMMARY OF THE INVENTION

The portable universal saw table of this invention is used to cut or rip long narrow pieces such as trim molding and siding particularly, although it can be used to also cut plywood and the like. It is intended to solve the problem of supporting a long piece of stock while sawing it without binding the saw during the process.

The table includes two rails which are mounted in parallel relationship and held there by cross pieces. Between the cross pieces there are attached to the rails several U-shaped channel brackets each bracket being open at the top and extending inwardly toward the other bracket of the pair on the opposite rail. Each of the channel brackets pairs is adapted to hold a standard 2×6 (or 2×8, 2×10, or 2×12 depending on the height of the table desired). It is the tops of these 2×6's or the like which form the supporting surface of the saw table. If a long piece of wood is placed across the tops of the 2×6's it may be cut crosswise with a power saw at any point between the 2×6's and the 2×6's will support both ends of the piece as it is being cut. Thus there is no cinching of the saw blade. The wood can also be cut or ripped transverse to the 2×6's and while the rotary power saw blade may thus actually cut into the 2×6, no harm is done. When the 2×6's become sufficiently chopped up they can be easily removed and a new piece substituted.

A back guide also provided for guiding the saw during the lengthwise cutting operation. The back guide has two depending legs which fit in hollow tubular members on the side of one of the rails.

The invention also provides a saw platform. The saw platform is a substantially square piece of plywood having short legs that are adapted to fit into the channel brackets. This saw platform would be substituted for several of the 2×6's and thus would form a base for a power miter saw.

The entire saw table is supported on two saw horses or the like and since the device may be about eight feet long or longer it may be built in two sections which can be bolted or hinged together.

DESCRIPTION OF THE DRAWINGS

FIGS. 2 is a top plan view of the saw table.

FIG. 3 is a side elevational view of the saw table and the saw horses showing a power saw in place for lengthwise cutting.

FIG. 4 is an end view showing a rotary power saw in place on the saw platform for cross cutting.

DESCRIPTION OF THE PREFERRED EMBODIMENT

Figure 1:
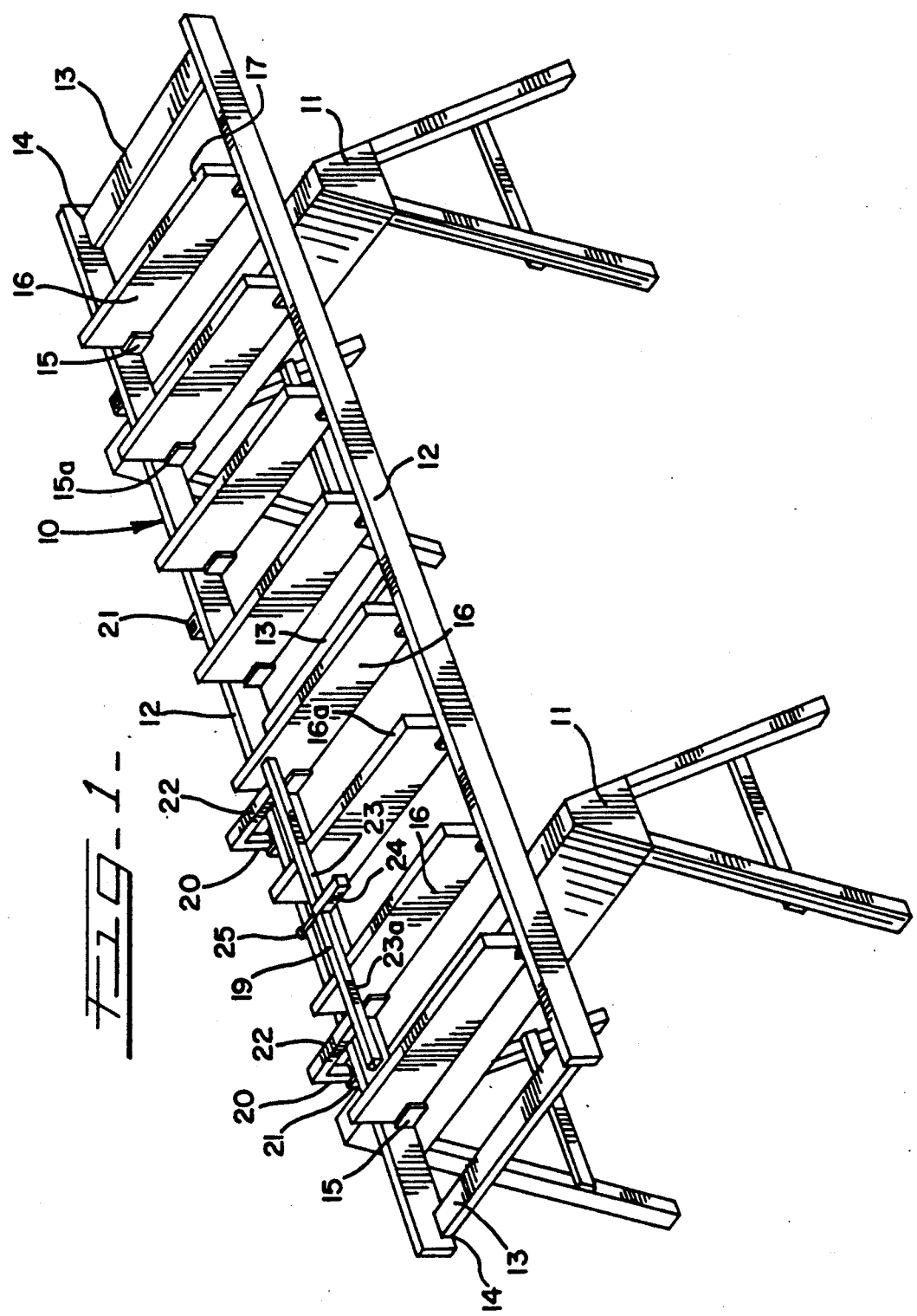
FIG. 1 is a perspective view of saw table of this invention, including the back guide, supported on a pair of saw horses.

Referring now to the drawings, FIG. 1 shows a perspective view of the portable universal saw table 10 positioned on a pair of saw horses 11 of standard construction. The saw horses 11 are of the same height so as to provide a substantially horizontal position for the saw table 10. The saw table 10 includes a pair of rails 12 which may be made of metal, wood or any other suitable material. The rails 12 are parallel to each other and are held in that relationship by cross pieces 13 which are welded or otherwise joined to the rails 12 at 14. Between the cross pieces 13 and on the inner side of the rails 12 there are welded, or otherwise connected, a plurality of U-shaped channel brackets 15 which are open at the top 15a and extend toward the opposite bracket on the opposite rail. Thus a pair of corresponding brackets 15 is provided along the inside of the rails 12. The brackets are preferably on 12" centers and one pair of brackets is adapted to removably hold a standard piece of lumber 16 that may be either a 2×6, 2×8, 2×10 or 2×12 depending upon the height of the table desired. The lumber pieces 16 at any one time would be of the same size, for example, 2×6's so that the tops 16a of the pieces 16 create a substantially horizontal supporting surface. An elongated work piece 17 such as a piece of wood, plywood, molding or the like may be placed across the tops 16a of the lumber pieces 16 and supported in that position for cutting or ripping. For example, a rotary power saw 18, as shown in FIG. 4 may be used to cross cut such a piece between adjacent lumber pieces 16. The support provided by the additional lumber pieces 16 will allow the work piece 17 and particularly the ends 17a and 17b to remain in a substantially horizontal position during cutting so that there will be no binding or cinching on the saw blade as this operation proceeds.

The work piece 17 may also be ripped or cut lengthwise by a rotary saw 18 as shown in FIG. 3. Again, the support provided by the lumber pieces 16 maintains the work piece 17, which again may be plywood, molding or the like, so that it can be ripped without binding the saw blade. It will be noted, however, that while ripping a work piece 17 the saw blade 18a of the saw 18 will actually cut into the lumber pieces 16. This is more clearly shown in FIG. 3 where the saw blade 18a is clearly below the level of the height of the lumber pieces 16. No harm is done because of this, however, since the lumber pieces 16 are removably located in the brackets 15 and when a lumber piece such as a piece of 2×6 becomes sufficiently chopped up through cutting operations, it is merely removed and discarded and a new lumber piece 16 inserted.

A work table of this invention also provides a back guide 19 for guiding the power saw 18 during the ripping. The back guide includes a pair of vertical legs 20 which are insertable in the holding brackets 21 located and attached along the outer edge of one of the rails 12. The legs 20 are 20 square tubular stock and are bent on a right angle to provide a guide support 22 which is parallel to the surface of the work piece 17. Attached to the guide support 22 is a back guide bar 23, the bottom edge 23a of which rests on the surface of at least two of the lumber pieces 16. A stud 24 removably is attached to the center portion of the back guide bar and held there by means of a set screw 25. In operation, the back guide bar would abut the edge of the work piece 17 to hold it in position on the saw table 10. The stud 24 abuts the top of the work piece 17 to maintain it in position during ripping operation. Once the saw 18 has cut by the back guide 19 the guide is moved to a new position in holding brackets 21.

A power saw platform 26 is also provided for supporting the rotary saw 18 during cross cutting operations. In order to position the power saw platform 26, two of the lumber pieces 16 are removed and the power saw platform 26, which has four short legs 28 which are fit into the brackets 15 to hold the table in position. The power saw base 27 is then placed on the platform 26 which allows the work pieces 17 to be cross cut.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A portable universal saw table comprising:
   a pair of spaced apart parallel and extensive support rails;
   means for holding said rails in said parallel spaced apart position;
   multiple pairs of support means attached to the inner surface of said rails and adapted to position disposable work piece supports therebetween; and a plurality of unconnected, individually removable and disposable work piece supports, each removably supported in said support means and having a vertical height greater than the vertical height of said rails, whereby said work piece supports are adapted to support an elongated work piece for cutting by a power saw and may be individually removed and disposed of.

2. The saw table of claim 1 wherein said pairs of support means are U shaped brackets.

3. The saw table of claim 2 wherein said work piece supports are wood boards.

4. The saw table of claim 1 including a back guide for guiding the saw during cutting operation.

5. The saw table of claim 1 including a saw platform positioned in said support means in place of said disposable work piece supports.

6. A portable universal saw table comprising:
   a pair of spaced apart parallel and extensive metal support rails;
   a plurality of metal cross pieces welded between said rails to rigidly maintain said rails in said parallel spaced apart position;
   a plurality of pairs of U shaped metal brackets welded to the inner surface of said rails between said cross pieces; and
   a plurality of unconnected, disposable wooden work piece supports, each individually removably supported in a respective pair of said brackets, each said work piece support having an upper surface extending vertically above said rails, whereby said work piece supports are adapted to support an elongated wooden work piece for cutting by a power saw and may be individually removed and disposed of.

7. A portable universal saw table comprising:
   a pair of spaced apart parallel and extensive support rails;
   means for holding said rails in said parallel spaced apart position and;
   multiple pairs of support means attached to the inner surface of said rails and adapted to removably position disposable work piece supports therebetween to support an elongated work piece for cutting by a power saw.

* * * * *